US009875442B2

(12) United States Patent
Qiu et al.

(10) Patent No.: US 9,875,442 B2
(45) Date of Patent: Jan. 23, 2018

(54) METHOD, APPARATUS, AND ARTIFICIAL INTELLIGENCE EDITOR FOR IMPLEMENTING ARTIFICIAL INTELLIGENCE BEHAVIOR

(71) Applicant: TENCENT TECHNOLOGY (SHENZHEN) COMPANY LIMITED, Shenzhen (CN)

(72) Inventors: Linhui Qiu, Shenzhen (CN); Xuxin Wang, Shenzhen (CN); Jianhui Yao, Shenzhen (CN); Yong Zhong, Shenzhen (CN); Min Yang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 466 days.

(21) Appl. No.: 14/592,139

(22) Filed: Jan. 8, 2015

(65) Prior Publication Data
US 2015/0154495 A1    Jun. 4, 2015

Related U.S. Application Data

(63) Continuation of application No. PCT/CN2014/080399, filed on Jun. 20, 2014.

(30) Foreign Application Priority Data

Nov. 29, 2013 (CN) .......................... 2013 1 0632412

(51) Int. Cl.
*G06N 5/04* (2006.01)

(52) U.S. Cl.
CPC .................................. *G06N 5/048* (2013.01)

(58) Field of Classification Search
None
See application file for complete search history.

(56) References Cited

U.S. PATENT DOCUMENTS

2006/0101392 A1* 5/2006 Isaza .......................... G06F 8/38
717/108
2009/0125370 A1* 5/2009 Blondeau .............. G06F 9/5066
705/7.27

(Continued)

FOREIGN PATENT DOCUMENTS

CN    101548300 A    9/2009
CN    101699452 A    4/2010

(Continued)

OTHER PUBLICATIONS

The State Intellectual Property Office of the People's Republic of China (SIPO) Office Action 1 for 201310632412.2 dated Nov. 30, 2016 pp. 1-10.

(Continued)

*Primary Examiner* — Alan Chen
(74) *Attorney, Agent, or Firm* — Anova Law Group, PLLC

(57) ABSTRACT

Methods, apparatus and artificial intelligence (AI) editors for implementing an AI behavior are provided herein. In an exemplary method, an AI behavior configuration file can be obtained. The AI behavior configuration file can be configured using at least one preset component, and the AI behavior configuration file matches logic of a preset AI behavior. It can be tested whether a result of running the AI behavior configuration file reaches a preset effect. When the result of running the AI behavior configuration file reaches the preset effect, the preset AI behavior can be implemented according to the AI behavior configuration file.

17 Claims, 6 Drawing Sheets

(56) References Cited

U.S. PATENT DOCUMENTS

2013/0053151 A1    2/2013   Sohn et al.
2013/0254142 A1*   9/2013   Hodjat .................. G06N 3/126
                                                        706/12

FOREIGN PATENT DOCUMENTS

CN    102663245 A    9/2012
CN    102073487 B    8/2013
TW    200819177 A    5/2008
TW    201116324 A    5/2011

OTHER PUBLICATIONS

Taiwan Intellectual Property Office (TIPO) Office Action 1 for 103141193 dated Sep. 7, 2015 pp. 1-6.
The World Intellectual Property Organization (WIPO) International Search Report for PCT/CN2014/080399 dated Sep. 26, 2014 pp. 1-3

* cited by examiner

METHOD, APPARATUS, AND ARTIFICIAL INTELLIGENCE EDITOR FOR IMPLEMENTING ARTIFICIAL INTELLIGENCE BEHAVIOR

CROSS-REFERENCES TO RELATED APPLICATIONS

This application is a continuation application of PCT Patent Application No. PCT/CN2014/080399, filed on Jun. 20, 2014, which claims priority to Chinese Patent Application No. 201310632412.2, filed on Nov. 29, 2013, the entire contents of which are incorporated herein by reference.

FIELD OF THE DISCLOSURE

The present disclosure generally relates to the field of artificial intelligence and, more particularly, relates to methods, apparatus, and artificial intelligence editors for implementing an artificial intelligence behavior.

BACKGROUND

Artificial intelligence (AI) refers to technologies that simulate human thinking and action by using modern tools such as computers. With continuous advancement of AI technologies, AI technologies have been applied to various aspects of industrial manufacturing and human life.

For example, when the AI technologies are applied to a game application program, an entity having human-like behaviors is generated. The entity is an AI agent. Because the AI agent can exhibit intelligent behaviors and activities similar to intelligent behaviors and activities of human, or characteristics consistent with a player's thinking and perception, the AI agent can improve playability of the game application program.

During the design of an application program related to AI, the focus of the design of the application program related to AI is how to make an AI agent implement a certain AI behavior. When a simple method for implementing an AI behavior is used, efficiency of designing the application program related to AI can be improved.

Conventionally, during the design of an application program related to AI, a method typically used for implementing an AI behavior includes the following steps. First, an AI planner designs logic of an AI behavior to be implemented by an AI agent. Next, a program developer compiles the logic of the AI behavior to be implemented by the AI agent into corresponding code. Then, the planner runs the compiled code and detects whether the compiled code can reach or generate preset effects of the AI behavior. When the AI agent generates the preset effects of the AI behavior, the AI behavior of the AI agent is thus implemented. Otherwise, when the AI agent does not generate the preset effects of the AI behavior, the code needs to be compiled and debugged until the AI agent generates the preset effects of the AI behavior.

However, existing technologies have various problems. For example, when existing technology is used for implementing an AI behavior, code needs to be compiled and constantly adjusted. Therefore, a development cycle needed for implementing an AI behavior is often long, and efficiency of implementing an AI behavior is low. In addition, when a certain AI behavior needs to be added to or deleted from a certain application program, code needs to be modified in order to implement the adding or deleting. Further, after the adding or deleting of the AI behavior, the code needs to be compiled and debugged again. Modifying the code is often cumbersome. The invested time and labor cost is thus significant.

BRIEF SUMMARY OF THE DISCLOSURE

One aspect of the present disclosure includes methods for implementing an artificial intelligence (AI) behavior. In an exemplary method, an AI behavior configuration file can be obtained. The AI behavior configuration file can be configured using at least one preset component, and the AI behavior configuration file matches logic of a preset AI behavior. It can be tested whether a result of running the AI behavior configuration file reaches a preset effect. When the result of running the AI behavior configuration file reaches the preset effect, the preset AI behavior can be implemented according to the AI behavior configuration file.

Another aspect of the present disclosure includes apparatus for implementing an AI behavior. An exemplary apparatus can include an obtaining module, a testing module, and an implementing module. The obtaining module is configured to obtain an AI behavior configuration file. The AI behavior configuration file can be configured using at least one preset component and the AI behavior configuration file matches logic of a preset AI behavior. The testing module is configured to test whether a result of running the AI behavior configuration file reaches a preset effect. The implementing module is configured to, when the result of running the AI behavior configuration file reaches the preset effect, implement the preset AI behavior according to the AI behavior configuration file.

Another aspect of the present disclosure includes a non-transitory computer-readable medium having computer program. When being executed by a processor, the computer program performs a method for a method for implementing an artificial intelligence (AI) behavior. The method includes obtaining an AI behavior configuration file, wherein the AI behavior configuration file is configured using at least one preset component and the AI behavior configuration file matches logic of a preset AI behavior; testing whether a result of running the AI behavior configuration file reaches a preset effect; and implementing the preset AI behavior according to the AI behavior configuration file when the result of running the AI behavior configuration file reaches the preset effect.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the disclosure.

DETAILED DESCRIPTION

Reference will now be made in detail to exemplary embodiments of the disclosure, which are illustrated in the accompanying drawings.

Various embodiments provide methods, apparatus, and artificial intelligence (AI) editors for implementing an AI behavior. The methods disclosed herein can involve an AI editor, one or more AI servers, an AI behavior testing apparatus, and/or node configuration. In some embodiments, each of the AI editor, the AI server, the AI behavior testing apparatus, and the node configuration can be implemented on a separate computer system. In other embodiments, some or all of the AI editor, the AI server, the AI behavior testing apparatus, and the node configuration can be implemented on one computer system.

When any of the AI editor, the AI server and the node configuration are implemented by separate computer systems, the separate computer systems can be coupled via a communication network for information exchange, e.g., sending/receiving result of running an AI behavior configuration file, sending/receiving application program environment data, sending/receiving an AI behavior configuration file, calling encapsulated components, etc.

The communication network may include any appropriate type of communication network for providing network connections to the computer systems that implement the AI editor, the AI server, the AI behavior testing apparatus, and/or the node configuration. For example, the communication network may include the Internet or other types of computer networks or telecommunication networks, either wired or wireless.

An AI server, as used herein, may refer to one or more server computers configured to control an AI agent to perform an AI behavior matching a current environment in an application program. The AI server can perform such a function for one of one or more application programs. On one AI server, AI system of at least one application program can be mounted. For example, one application program can have one corresponding AI system.

Figure 8:
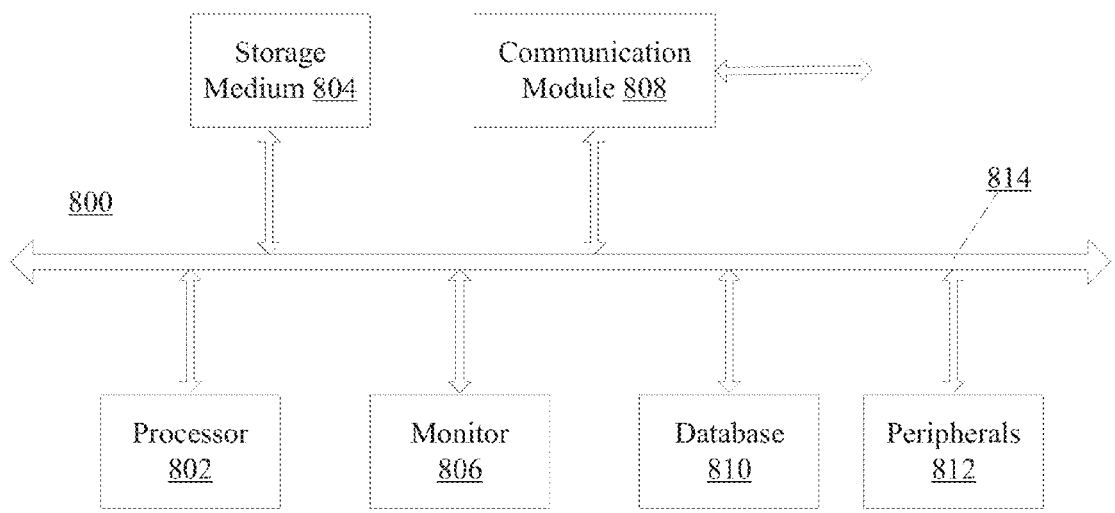
FIG. 8 depicts an exemplary computer system consistent with the disclosed embodiments.

FIG. 8 shows a block diagram of an exemplary computing system 800 capable of implementing the AI editor, the AI server, the AI behavior testing apparatus, and/or the node configuration. As shown in FIG. 8, the exemplary computer system 800 may include a processor 802, a storage medium 804, a monitor 806, a communication module 808, a database 810, peripherals 812, and one or more bus 814 to couple the devices together. Certain devices may be omitted and other devices may be included. In various embodiments, the computer system 800 may include one or more processors to execute computer programs in parallel.

The processor 802 can include any appropriate processor or processors. Further, the processor 802 can include multiple cores for multi-thread or parallel processing. The storage medium 804 may include memory modules, e.g., Read-Only Memory (ROM), Random Access Memory (RAM), and flash memory modules, and mass storages, e.g., CD-ROM, U-disk, removable hard disk, etc. The storage medium 804 may store computer programs for implementing various processes (e.g., encapsulating code into components, configuring an AI behavior configuration file, testing an AI behavior configuration file, implementing an AI behavior, etc.), when executed by the processor 802.

The monitor 806 may include display devices for displaying contents in the computing system 800, e.g., providing a preview of effect of running the AI behavior, or displaying a game interface. The peripherals 812 may include I/O devices such as keyboard and mouse.

Further, the communication module 808 may include network devices for establishing connections through the communication network. The database 810 may include one or more databases for storing certain data and for performing certain operations on the stored data, e.g., storing AI behavior configuration files, storing encapsulated components, managing AI rule library, etc.

With rapid development of computer technology, more and more application programs are applied to human life and bringing great convenience and fun into human life. With rapid development of AI technologies, more and more AI technologies are applied to application programs on modern tools such as computers, thus enabling the modern tools such as computers to simulate and perform behaviors similar to human thinking and human behaviors. The application programs can thus become increasingly intelligent and entertaining.

As used herein, wherever applicable, 'application program can be used interchangeably with 'application'. An application or application program can refer to any appropriate software program that accomplishes a certain specific purpose.

In an application related to AI technologies, human thinking and action can usually be given to one or more entities. Such an entity is an AI agent. An AI agent generally refers to an entity that has goal(s), behavior(s) and knowledge, and operates independently in a certain environment. A typical example of an AI agent is a monster or non-player character (NPC) in an application. In addition, during operation of an application program involving interaction, e.g., battle, between human and computer, an AI agent can be a role played by the computer. A behavior performed by an AI agent that is similar to human thinking and human behavior is referred to as an AI behavior.

During the planning of an application related to AI technologies, the key to designing the application related to AI is how to make an AI agent exhibit a certain AI behavior. For example, in a type of application programs including chess or playing cards between a human and a computer, major consideration for designing such a type of application programs includes how to make an AI agent played by the computer implement an AI behavior of playing a card. In addition, in application programs involving a monster, major consideration for designing such a type of application programs includes how to make the monster played by the computer exhibit AI behaviors including, e.g., attacking, chasing, and any other appropriate behaviors. In order to make an AI agent exhibit a certain AI behavior, the AI behavior needs to be designed according to the application program, and it needs to be ensured that the designed AI behavior can be implemented.

For ease of description, in various embodiments where an application program of playing cards is described, a playing card can be referred to as a card. 'A playing card having a symbol 10-of-Hearts' can also be referred to as 'a 10-of-Hearts card'. Playing cards having other symbols can be referred to in a similar manner. 'Playing a playing card' can be referred to as 'playing a card'.

To implement an AI behavior, logic relationship(s) related to AI behaviors of an AI agent needs to be designed for various AI agents. Next, a program compiler can compile the logic relationship into corresponding code. The code can be run to test whether the AI behavior can be implemented. Thus, a process for implementing the AI behavior may need the planner and the program compiler to participate simultaneously. A development cycle can thus be long.

Figure 1:
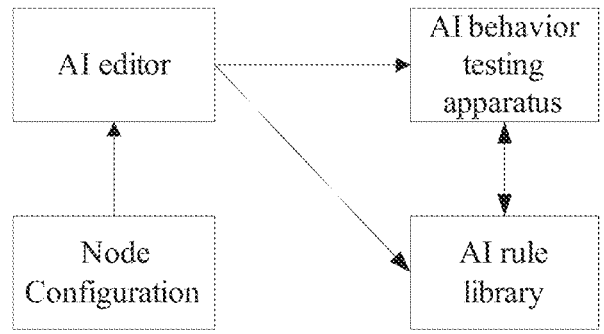
FIG. 1 depicts an exemplary environment for implementing methods for implementing an AI behavior in accordance with various disclosed embodiments.

In view of the problems set forth above and other problems, various embodiments provide a method for implementing an AI behavior. FIG. 1 depicts an exemplary environment for implementing methods for implementing an AI behavior in accordance with various disclosed embodiments. As shown in FIG. 1, various components can be stored in node configuration. The components have been encapsulated beforehand. During the storing of the components, contents including, e.g., type, function, detailed information, initialization parameter(s), and mounting topology of each component can be stored in the node configuration at the same time. During the design of an AI behavior, preset components can be called from the node configuration by an AI editor, to configure an AI behavior configuration file for implementing the AI behavior. After the AI behavior configuration file for implementing the AI behavior is configured, the configured AI behavior configuration file can be run via an AI behavior testing apparatus. A result of running the AI behavior configuration file can be previewed. It can thus be determined whether the result of running the AI behavior configuration file is consistent with a preset result of running the AI behavior.

Figure 2:
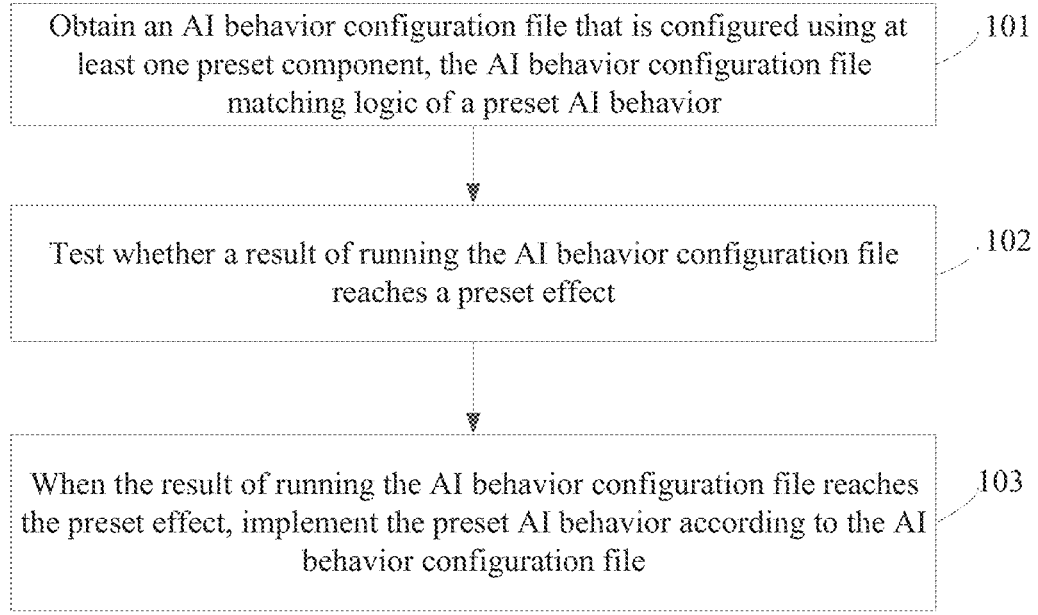
FIG. 2 depicts a flow diagram of an exemplary method for implementing an AI behavior in accordance with various disclosed embodiments.

The disclosed methods for implementing an AI behavior can be detailed in the following examples. FIG. 2 depicts a flow diagram of an exemplary method for implementing an AI behavior in accordance with various disclosed embodiments.

Referring to FIG. 2, in Step 101, an AI behavior configuration file is obtained. The AI behavior configuration file can be configured and generated using at least one preset component. The AI behavior configuration file can match logic of a preset AI behavior.

The preset AI behavior can refer to an AI behavior that a planner desires to implement, i.e., to have an AI agent to perform or implement under a certain condition according to the needs of designing an application program. The logic of the preset AI behavior can refer to any appropriate relation between the preset AI behavior and condition or data of the application program. The logic can be pre-designed with the preset AI behavior.

In Step 102, it is tested whether a result of running the AI behavior configuration file reaches a preset effect. In Step 103, when the result of running the AI behavior configuration file reaches the preset effect, the preset AI behavior is implemented based on the AI behavior configuration file. In various embodiments, implementing the AI behavior can include completing the configuring of the AI behavior configuration file and optionally storing it in an appropriate rule base on an appropriate server.

As used herein, wherever applicable, 'reaching a preset effect' refers to generating an effect that is similar to, same as, and/or consistent with the preset effect. The preset effect can be pre-determined during the design of the preset AI behavior.

Optionally, before the AI behavior configuration file is obtained, the method can further include the following steps. Code for implementing specific functions is encapsulated into components for implementing specific functions. The components, and type(s), function(s), detailed information, initialization parameter(s), and mounting topology of the components are stored in the node configuration. The obtaining of the AI behavior configuration file can include calling at least one preset component from the node configuration to configure the AI behavior configuration file.

Optionally, the obtaining of the AI behavior configuration file can include the following steps. At least one preset component can be called from the node configuration to configure a first AI behavior configuration file. A second AI behavior configuration file can be obtained from an AI rule library. The AI rule library can have at least one AI behavior configuration file pre-stored, i.e., stored beforehand. The first AI behavior configuration file and the second AI behavior configuration file can then be combined to obtain the AI behavior configuration file.

Optionally, the obtaining of the AI behavior configuration file can include obtaining the AI behavior configuration file from the AI rule library. The AI rule library can have at least one AI behavior configuration file pre-stored.

Optionally, after calling at least one preset component from the node configuration to configure the AI behavior configuration file, the configured AI behavior configuration file can be stored in the AI rule library.

Optionally, the testing of whether a result of running the AI behavior configuration file reaches a preset effect can include the following steps. Application program environment data related to the preset effect can be loaded. The AI behavior configuration file can be run by integrating the application program environment data. It can be previewed whether the result of running the AI behavior configuration file is consistent with the preset effect. When the result of running the AI behavior configuration file is consistent with the preset effect, the result of running the AI behavior configuration file reaches the preset effect.

In various embodiments, when the AI behavior configuration file is run by integrating the application program environment data, the application program environment data can be used as parameters (e.g., environment data of a game application program) needed for running the AI behavior configuration file within a game environment during the testing.

Optionally, after the preset AI behavior is implemented based on the AI behavior configuration file, the method can further include the following steps. The AI behavior configuration file can be sent to an AI server. Thus, the AI server can update the AI rule library that stores the AI behavior configuration file. The AI server can have AI system(s) of at least one application. For example, the at least one application can each have one AI system. The AI system can include an AI rule library. The AI rule library can store at least one AI behavior configuration file.

Using the methods in accordance with various embodiments, an AI behavior configuration file can be obtained. The AI behavior configuration file can be configured and generated using at least one preset component. It can be tested whether a result of running the AI behavior configuration file reaches a preset effect. Thus, an AI behavior does not have to be implemented by compiling code. Operation of implementing the AI behavior can be simple. The development cycle for implementing the AI behavior can be shortened. The efficiency of implementing the AI behavior can be improved. In addition, when a certain AI behavior needs to be added to or deleted from a certain application, such adding or deleting can be accomplished simply by modifying a component that is called. The code no longer needs to be modified. Thus, time and labor cost to be invested can be reduced.

Figure 3:
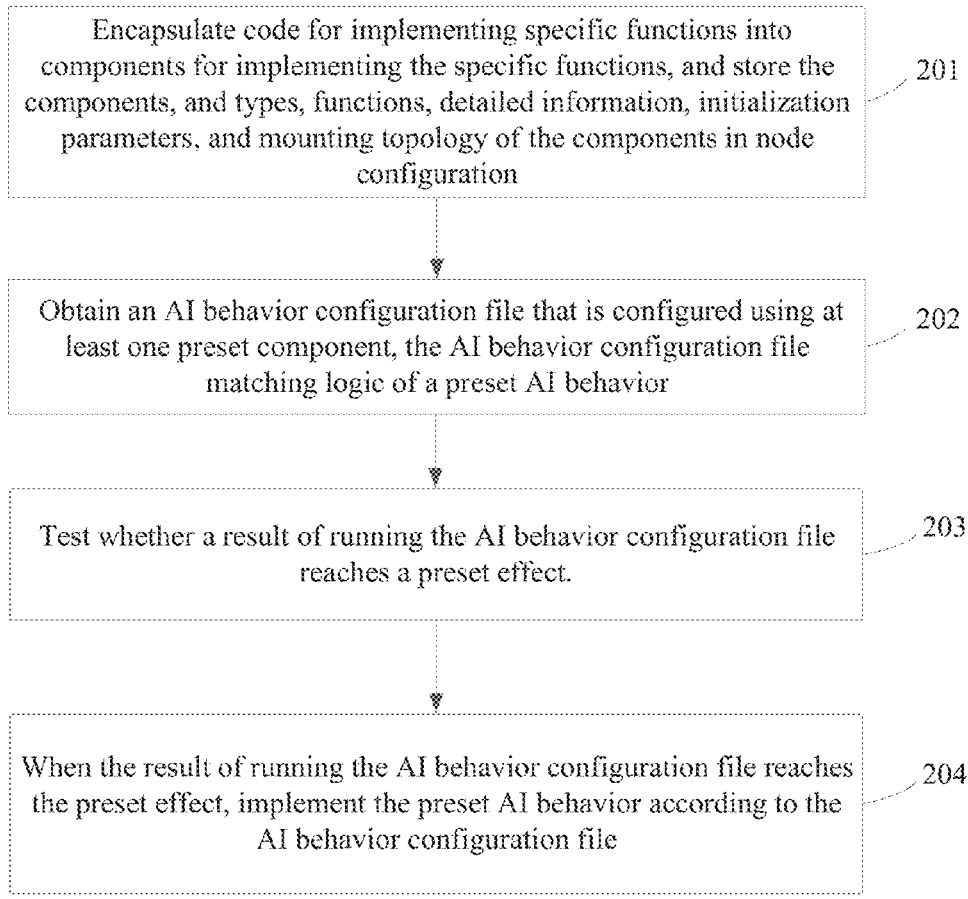
FIG. 3 depicts a flow diagram of another exemplary method for implementing an AI behavior in accordance with various disclosed embodiments.

FIG. 3 depicts a flow diagram of another exemplary method for implementing an AI behavior in accordance with various disclosed embodiments. For illustrative purposes, in certain examples, the method for implementing an AI behavior can be executed by an AI editor. The method can include the following exemplary steps.

In Step 201, code for implementing specific functions is encapsulated into components for implementing specific functions. The components, and type(s), function(s), detailed information, initialization parameter(s), and mounting topology of the components are stored in node configuration.

In order to implement an AI behavior, corresponding code needs to be compiled according to logic of the AI behavior to be implemented. Further, the code needs to be run to test and determine whether the AI behavior can be implemented. Thus, a process for implementing the AI behavior is often complicated. A development cycle can thus be long.

However, by using the methods disclosed herein, before implementing an AI behavior, via certain encapsulating tools or means, code for implementing specific functions can be encapsulated into component(s) for implementing the specific functions. An encapsulated component can have a function independent of other components. Interface between components can be specified by a contract. A component can have a clear dependence on context, can be deployed independently, and can be assembled.

Methods for encapsulating the code for implementing specific functions into the component(s) for implementing the specific functions can be any appropriate methods, and are not limited in the present disclosure. The tools or means used for the encapsulating can be any appropriate tools or means, and are not limited in the present disclosure. For example, the AI editor may encapsulate the code for implementing specific functions into the component(s) for implementing the specific functions.

Further, in various embodiments, in order to quickly determine which components to call during the subsequent implementing of an AI behavior, the encapsulated components for implementing the specific functions, and type(s), function(s), detailed information, initialization parameter(s), and mounting topology of the components can be stored in node configuration at the same time. Thus, when the components are subsequently being used, the components that are needed can be directly called from the node configuration. The components stored in the node configuration can be called by various different AI agents in the same application, and/or be called by AI agents in different application programs. Thus, the components not only are versatile, but also can improve efficiency of designing an application program during the design of the application program.

For example, in order to distinguish between different functions implemented by different components, during the storing of components, various components can be classified. The functions implemented by the components can be divided into various types. Accordingly, the components can be classified into various types. For example, the components can be classified into classifying component, selecting component, condition component, and/or behavior component.

A condition component can refer to a component that executes a function of judging condition(s) and returning result of the judging, e.g., a component for judging whether a player currently has a K-of-Hearts playing card. A behavior component can refer to a component that executes a specified function (i.e., a function that is set), e.g., a component for playing a K-of-Hearts card. A selecting component can refer to a component that can select a component for executing based on certain screening rule(s). The screening rules can include, but are not limited to, a maximum-weight-selection mode, a random-selection mode, a sequential-selection mode, or any other appropriate modes.

In addition, in the methods according to various disclosed embodiments, a planner can directly call one or more components from the node configuration via the AI editor, or can directly call one or more AI behavior configuration files pre-stored in an AI rule library, in order to implement an AI behavior. Therefore, during the storing of the components, detailed information of the components can be stored in the node configuration. The detailed information of the components can include, e.g., description of specific usage of the components. In addition, initialization parameters and mounting topology of the components can be stored in the node configuration at the same time. The mounting topology of the components can be designed according to an AI behavior to be implemented by an AI agent in a specific application program. For example, a selecting component can be mounted with at least one behavior component. A behavior component can be mounted at least one condition component. As used herein, when a first component is mounted with a second component, the first component has the second component mounted on the first component.

In Step 202, the AI editor obtains an AI behavior configuration file that is configured using at least one preset component. The AI behavior configuration file can match logic of a preset AI behavior. In various embodiments, the AI editor can configure the AI behavior configuration file by using at least one preset component.

To implement the AI behavior via the AI editor, the planner of the AI behavior of the application can pre-design or preset the logic of the AI behavior. Next, via the AI editor, the planner can obtain an AI behavior configuration file that is configured using at least one preset component. The configured AI behavior configuration file needs to match logic of the preset AI behavior.

The AI editor can obtain the AI behavior configuration file configured using at least one preset component using various methods. During actual implementations, the obtaining of the AI behavior configuration file can include, but are not limited to, the methods described in the following examples.

In the first example for obtaining the AI behavior configuration file, the AI editor can call at least one preset component from the node configuration to configure the AI behavior configuration file. In various embodiments, the encapsulated components, and type(s), function(s), detailed information, initialization parameter(s), and mounting topology of the components are stored in the node configuration. Therefore, during the implementing of the AI behavior, based on the logic of the AI behavior, the AI editor can obtain multiple components matching the logic of the AI behavior. The logic of the AI behavior can be designed beforehand, i.e., pre-designed. The multiple components can be combined using certain methods that match the logic of the AI behavior, to configure and thus generate or obtain the AI behavior configuration file.

In the second example for obtaining the AI behavior configuration file, at least one preset component can be called from the node configuration to configure a first AI behavior configuration file. A second AI behavior configuration file can be obtained from an AI rule library. The AI rule library can have at least one AI behavior configuration file pre-stored, i.e., stored beforehand. The first AI behavior configuration file and the second AI behavior configuration file can then be combined to obtain the AI behavior configuration file.

After each time of obtaining an AI behavior configuration file by combining various components, the AI behavior configuration file that has already been designed can be stored. Thus, it can be ensured that the stored AI behavior configuration file can be directly called to configure other AI behavior configuration file(s) that have functions similar to the function of the stored AI behavior configuration file, or that the stored AI behavior configuration file can be combined with one or more other files to implement other AI behavior(s).

In various embodiments, assuming AI behavior configuration file(s) for implementing certain functions has already been designed and stored in the AI rule library. Thus, to obtain the AI behavior configuration file, the AI editor can call one or more AI behavior configuration files that have been stored in the AI rule library, and call at least one preset component from the node configuration. In this case, the at least one preset component called from the node configuration and the one or more AI behavior configuration files called from the AI rule library can be merged and combined to obtain an AI behavior configuration file for implementing a certain AI behavior.

In the third example for obtaining the AI behavior configuration file, the AI behavior configuration file can be obtained from the AI rule library. The AI rule library can have at least one AI behavior configuration file pre-stored.

In this case, for a certain AI behavior, when one or more AI behavior configuration files that have been configured and stored in the AI rule library can be directly called to be combined to obtain the AI behavior configuration file for implementing the certain AI behavior, the AI editor can directly call the one or more AI behavior configuration files from the AI rule library, to configure the AI behavior configuration file for implementing the certain AI behavior. In addition, the AI editor can further run the one or more AI behavior configuration files that have been configured and stored in the AI rule library, to test or optimize the one or more AI behavior configuration files or the AI behaviors corresponding to the one or more AI behavior configuration files.

Optionally, when the AI behavior configuration file is configured by the AI editor by calling at least one preset component from the node configuration (e.g., as shown in the first example for obtaining the AI behavior configuration), after the AI behavior configuration file is configured, the configured AI behavior configuration file can be stored in the AI rule library. Thus, during the subsequent design of AI behavior configuration files for implementing other AI behaviors, the AI behavior configuration files for implementing other AI behaviors can be configured by integrating the exemplary methods as described above in the second or the third example for obtaining the AI behavior configuration file.

In Step 203, it is tested whether a result of running the AI behavior configuration file reaches a preset effect. In order to verify whether the designed AI behavior configuration file can implement the preset AI behavior, it is tested whether a result of running the AI behavior configuration file reaches a preset effect. The testing of whether the result of running the AI behavior configuration file reaches a preset effect can be accomplished via an AI behavior testing apparatus.

In one embodiment, the AI behavior testing apparatus can be an independent apparatus that does not depend on the AI editor. In this case, after the AI behavior testing apparatus loads the configured AI behavior configuration file via the AI editor, the AI behavior testing apparatus can run the AI behavior configuration file and test whether the result of running the AI behavior configuration file reaches the preset effect.

In another embodiment, the AI behavior testing apparatus can be integral with the AI editor, i.e., can be integrated with the AI editor as structurally a whole. During the testing of whether the result of running the AI behavior configuration file reaches the preset effect, the AI behavior configuration file can be directly imported into the AI behavior testing apparatus.

The testing of whether the result of running the AI behavior configuration file reaches the preset effect can be accomplished using various methods that are not limited in the present disclosure. In practical implementation, the methods can include, but are not limited to the following exemplary process.

For example, Application program environment data related to the preset effect can be loaded. The AI behavior configuration file can be run by integrating the application program environment data. It can be previewed whether the result of running the AI behavior configuration file is consistent with the preset effect. When the result of running the AI behavior configuration file is consistent with the preset effect, the result of running the AI behavior configuration file reaches the preset effect.

By testing in real time whether the result of running the configured AI behavior configuration file is consistent with the preset effect, the AI behavior configuration file that is configured in real time can be tested in real time. By testing in real time whether the AI behavior configuration file that is configured by calling preset components can implement the AI behavior, the AI rule library of an application program can be adjusted and enriched. The AI behavior can be added to or deleted from the application program in real time. Further, the development cycle of implementing the AI behavior can be shortened. Time and labor cost that is invested can be saved. In addition, using the method in accordance with various embodiments, an AI behavior of an AI agent under a certain condition can become editable. Operation of implementing the AI behavior can thus be simplified.

In Step 204, when the result of running the AI behavior configuration file reaches the preset effect, the preset AI behavior is implemented according to the AI behavior configuration file. In various embodiments, after the result of running the AI behavior configuration file is tested, when the result of running the AI behavior configuration file reaches the preset effect, it can be determined that the AI behavior configuration file configured by calling the components can implement the preset AI behavior, according to the result of running the AI behavior configuration file. Further, it can be determined that the method or process for implement the AI behavior is successful.

On the other hand, after the result of running the AI behavior configuration file is tested, it is found that the result of running the AI behavior configuration file does not reach the preset effect, it is thus proven that the AI behavior configuration file that has been configured cannot implement the preset AI behavior. The AI behavior configuration file thus needs to be configured again, i.e., to be re-configured. In this case, the AI behavior configuration file can be re-configured using the steps or processes as described in various embodiments, e.g., Steps 202-204, until the result of running the configured AI behavior configuration file reaches the preset effect.

For illustrative purposes, the testing of whether a result of running an AI behavior configuration file reaches a preset effect can be explained in the following example. In the example, the AI behavior can include a behavior of an AI agent playing a 10-of-Hearts playing card.

First, the AI editor can load application program environment data related to a preset behavior of playing a 10-of-Hearts card, and load an AI behavior configuration file that is configured by using multiple components. Next, the AI editor can send the AI behavior configuration file to the AI behavior testing apparatus. The AI behavior testing apparatus can then run the AI behavior configuration file.

The AI behavior testing apparatus can include a display, i.e., a monitor. The monitor can be configured to provide a preview of effect of the AI behavior, i.e., a preview of a result of running the AI behavior configuration file. It can be previewed whether the AI agent can execute the AI behavior of playing the 10-of-Hearts card. When the AI agent executes the AI behavior of playing the 10-of-Hearts playing card at this time, it is proven that the AI behavior of playing the 10-of-Hearts card has been successfully operated.

Optionally, because the disclosed methods for implementing an AI behavior can be used to implement various AI behaviors, after a preset AI behavior is implemented according to an AI behavior configuration file, the AI behavior configuration file for implementing the preset AI can be sent to an AI server. The AI server can update the AI rule library that stores the AI behavior configuration file.

An AI server can include a server that controls an AI agent to perform an AI behavior matching a current environment in an application. The AI server can perform such controlling for one of one or more application programs. On one AI server, AI system of at least one application program can be mounted. For example, one application program can have one corresponding AI system.

The AI system of each application can include at least one AI rule library that can implement AI behaviors of the each application. The AI rule library can store one or more AI behavior configuration files, and each AI behavior configuration file can implement at least one function of an application. Each AI behavior configuration file can be obtained by calling at least one component in the node configuration.

By using the above-disclosed method or process of updating the AI rule library of the application, during the updating of the AI behavior of the application, there is no need to re-release a new version of the application program or to patch the application. Thus, the operation of updating the application program can be more convenient.

In addition, when different application programs are to implement a certain identical function, identical components can be used to configure AI behavior configuration files. Further, an AI system of an application can be designed by calling components to configure an AI behavior configuration file and further by combining AI behavior configuration files. Thus, it is no longer necessary to compile code for each application program in order to implement the each application program. Thus, efficiency of designing the AI system of the application program can be improved.

Using the methods in accordance with various embodiments, an AI behavior configuration file can be obtained. The AI behavior configuration file can be configured and generated using at least one preset component. It can be tested whether a result of running the AI behavior configuration file reaches a preset effect. Thus, an AI behavior does not have to be implemented by compiling code. Operation of implementing the AI behavior can be simplified. The development cycle for implementing the AI behavior can be shortened. The efficiency of implementing the AI behavior can be improved. In addition, when a certain AI behavior needs to be added to or deleted from a certain application, such adding or deleting can be accomplished simply by modifying a component that is called. The code no longer needs to be modified. Thus, investment of time and labor cost can be reduced.

Figure 4:
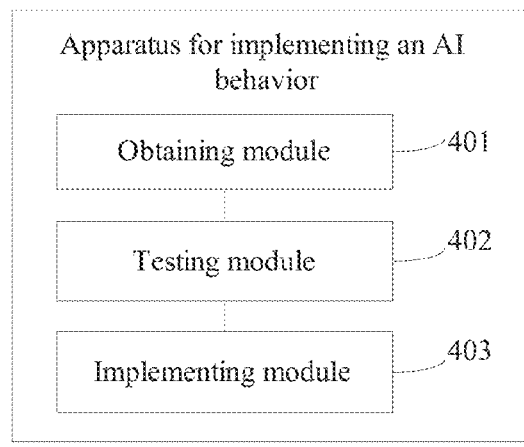
FIG. 4 depicts a structure diagram of an exemplary apparatus for implementing an AI behavior in accordance with various disclosed embodiments.

FIG. 4 depicts a structure diagram of an exemplary apparatus for implementing an AI behavior in accordance with various disclosed embodiments. As shown in FIG. 4, the apparatus can include an obtaining module 401, a testing module 402, and/or an implementing module 403. Certain modules may be omitted and other modules may be included.

The obtaining module 401 is configured to obtain an AI behavior configuration file configured using at least one preset component. The AI behavior configuration file can match logic of a preset AI behavior.

The testing module 402 is configured to test whether a result of running the AI behavior configuration file reaches a preset effect. The implementing module 403 is configured to implement the preset AI behavior according to the AI behavior configuration file when the result of running the AI behavior configuration file reaches the preset effect.

Figure 5:
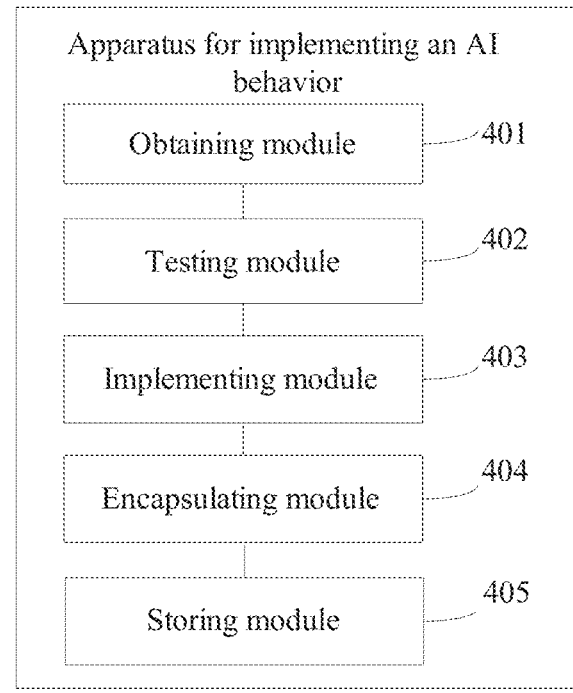
FIG. 5 depicts a structure diagram of another exemplary apparatus for implementing an AI behavior in accordance with various disclosed embodiments.

FIG. 5 depicts a structure diagram of another exemplary apparatus for implementing an AI behavior in accordance with various disclosed embodiments. As shown in FIG. 5, optionally, the apparatus can further include an encapsulating module 404, and a storing module 405.

The encapsulating module 404 is configured to encapsulate code for implementing specific functions into components for implementing the specific functions. The storing module 405 is configured to store the components, and type(s), function(s), detailed information, initialization parameter(s), and mounting topology of the components in node configuration. The obtaining module 401 is configured to call the at least one preset component from the node configuration to configure the AI behavior configuration file.

Optionally, the obtaining module 401 is configured to call the at least one preset component from the node configuration to configure a first AI behavior configuration file. The obtaining module 401 is further configured to obtain a second AI behavior configuration file from an AI rule library. The AI rule library can have at least one AI behavior configuration file pre-stored, i.e., stored beforehand. The obtaining module 401 is further configured to combine the first AI behavior configuration file and the second AI behavior configuration file to obtain the AI behavior configuration file.

Optionally, the obtaining module 401 is configured to obtain the AI behavior configuration file from the AI rule library. The AI rule library can have at least one AI behavior configuration file pre-stored.

Optionally, the storing module 405 is configured to store the configured AI behavior configuration file in the AI rule library.

Figure 6:
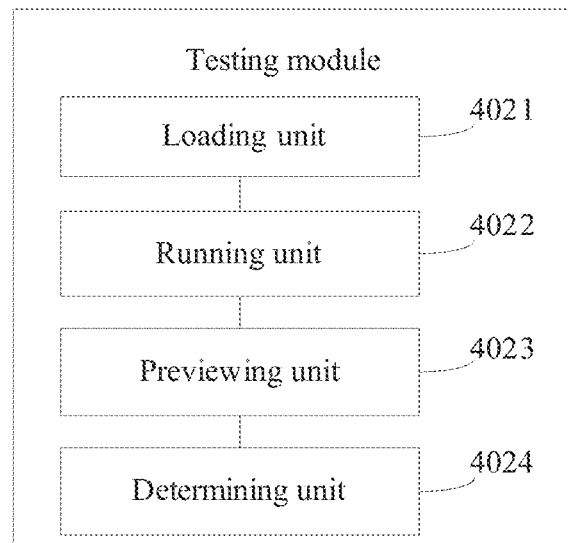
FIG. 6 depicts a structure diagram of an exemplary testing module in accordance with various disclosed embodiments.

FIG. 6 depicts a structure diagram of another exemplary testing module in accordance with various disclosed embodiments. As shown in FIG. 6, the testing module 402 can include a loading unit 4021, a running unit 4022, a previewing unit 4023, and/or a determining unit 4024. Certain units may be omitted and other units may be included.

The loading unit 4021 is configured to load application program environment data related to the preset effect. The running unit 4022 is configured to run the AI behavior configuration file by integrating the application program environment data.

The previewing unit 4023 is configured to preview whether the result of running the AI behavior configuration file is consistent with the preset effect. The determining unit 4024 is configured to determine that the result of running the AI behavior configuration file reaches the preset effect when the result of running the AI behavior configuration file is consistent with the preset effect.

Figure 7:
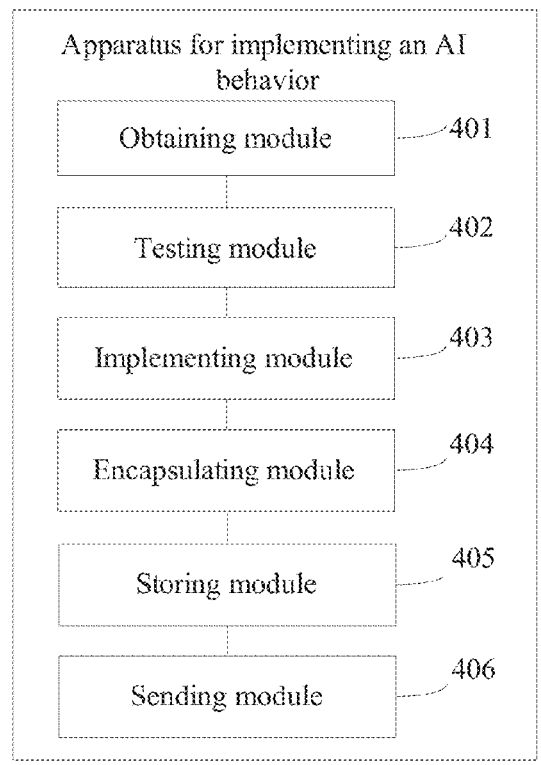
FIG. 7 depicts a structure diagram of another exemplary apparatus for implementing an AI behavior in accordance with various disclosed embodiments.

FIG. 7 depicts a structure diagram of another exemplary apparatus for implementing an AI behavior in accordance with various disclosed embodiments. Optionally, as shown in FIG. 7, the apparatus can further include a sending module 406. The sending module 406 is configured to send the AI behavior configuration file to an AI server, such that the AI server can update the AI rule library that stores the AI behavior configuration file. The AI server can be mounted with AI system(s) of at least one application. The AI system of each application can include an AI rule library. The AI rule library can store one or more AI behavior configuration files.

Using the apparatus in accordance with various embodiments, an AI behavior configuration file can be obtained. The AI behavior configuration file can be configured and generated using at least one preset component. It can be tested whether a result of running the AI behavior configuration file reaches a preset effect. Thus, an AI behavior does not have to be implemented by compiling code. Operation of implementing the AI behavior can be simplified. The development cycle for implementing the AI behavior can be shortened. The efficiency of implementing the AI behavior can be improved. In addition, when a certain AI behavior needs to be added to or deleted from a certain application, such adding or deleting can be accomplished simply by modifying a component that is called. The code no longer needs to be modified. Thus, investment of time and labor cost can be reduced.

Various embodiments also provide an AI editor for implementing an AI behavior. The AI editor can include the apparatus for implementing an AI behavior as described in various disclosed embodiments, e.g., as shown in FIGS. 4-7.

Using the AI editor in accordance with various embodiments, an AI behavior configuration file can be obtained. The AI behavior configuration file can be configured and generated using at least one preset component. It can be tested whether a result of running the AI behavior configuration file reaches a preset effect. Thus, an AI behavior does not have to be implemented by compiling code. Operation of implementing the AI behavior can be simplified. The development cycle for implementing the AI behavior can be shortened. The efficiency of implementing the AI behavior can be improved. In addition, when a certain AI behavior needs to be added to or deleted from a certain application, such adding or deleting can be accomplished simply by modifying a component that is called. The code no longer needs to be modified. Thus, investment of time and labor cost can be reduced.

When the disclosed apparatus for implementing an AI behavior implements an AI behavior, the above functional modules are divided merely for illustrative purposes. In practical applications, according to actual needs, the above-described functions can be allocated to different functional modules to be accomplished. That is, the internal structure of the apparatus can be divided into different functional modules to accomplished part or all of the above-described functions. Further details of the apparatus for implementing AI behavior are described in the methods for implementing an AI behavior according various embodiments, e.g., as shown in FIGS. 2-3.

In certain embodiments, optionally, the disclosed methods can involve AI rule(s). The AI rules can determine behavior of an AI agent under a certain condition. For example, in a game called 'Legend of Heroes', when an AI agent does not have 'full blood' (i.e., a certain level of points or energy in the 'Legend of Heroes' game), the AI agent plays a medicine card. The medicine card is a certain playing card used in the 'Legend of Heroes' game.

Optionally, the disclosed methods can involve an AI rule library. The AI rule library can include a configured collection of AI rules that can be for general usage. The AI rules can include, e.g., AI behavior configuration files that match logic of corresponding AI behaviors, respectively. For example, in the 'Legend of Heroes' game, the AI rule library can include configured AI trusteeship.

Figure 9:
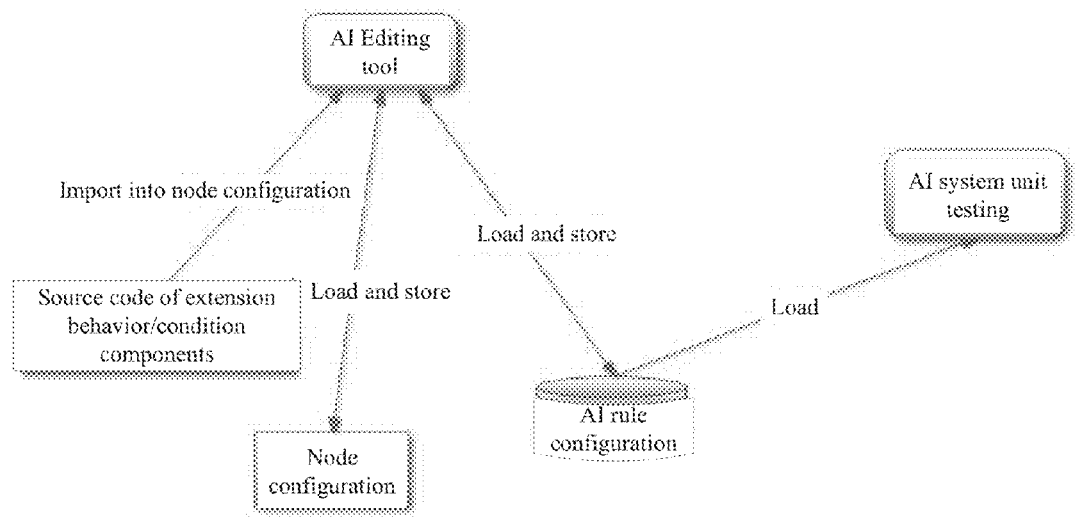
FIG. 9 depicts another exemplary environment for implementing methods for implementing an AI behavior in accordance with various disclosed embodiments.

FIG. 9 depicts another exemplary environment for implementing methods for implementing an AI behavior in accordance with various disclosed embodiments. As shown in FIG. 9, source code of extension components can be imported via an AI editing tool into node configuration to be used for subsequent loading. The extension components can refer to components needed for extending a game application program, e.g., adding an AI behavior to the game. The extension components can include, e.g., selecting component(s), condition component(s), and behavior component(s). A planner can edit and store AI rules. In addition, the planner can view editing effect of an AI rule in real time, via an AI system unit testing module.

Referring to FIG. 9, an AI editing tool can be referred to as an AI editor. The AI editor can be configured to edit an AI behavior, and store related AI logic relationship into AI rule configuration. In various embodiments, 'editing an AI behavior' can include configuring an AI behavior configuration file for implementing a preset AI behavior.

The 'AI system unit testing' module can be referred to as an AI behavior testing apparatus. The AI behavior testing apparatus can be configured to load various game environment data, load protocol data related to requesting an AI behavior, search AI rules, test AI behavior configuration file, and verify whether an AI behavior is consistent with expectation (e.g., whether result of running the AI behavior configuration file reaches a preset effect).

Node configuration can be configured to import standardized components via the AI editing tool. The node configuration can contain type of each component, usage instructions of the components, type and description of initialization parameter of the components, and mounting topology of the components.

Figure 10:
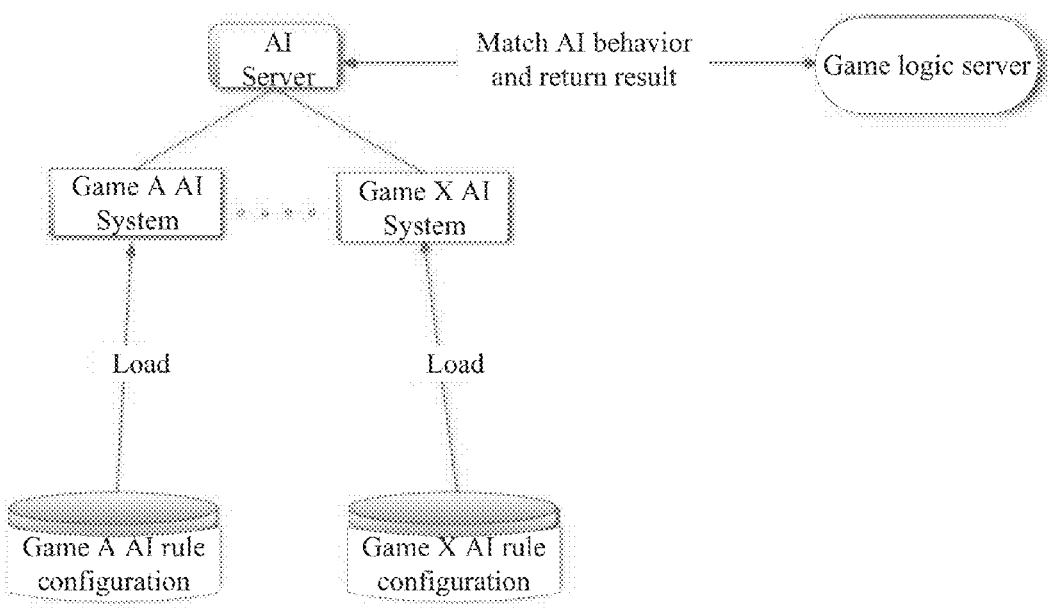
FIG. 10 depicts another exemplary environment for implementing methods for implementing an AI behavior in accordance with various disclosed embodiments.

FIG. 10 depicts another exemplary environment for implementing methods for implementing an AI behavior in accordance with various disclosed embodiments. As shown in FIG. 10, each AI system can include a dynamic link library that is loaded onto and processed by an AI server. One AI server can have AI systems of various different games loaded. When AI rules of a certain game are changed (e.g., adding or deleting AI behavior or AI behavior configuration file), the changing can be accomplished simply by calling reload configuration (e.g., ReloadCfg) interface on the AI server. Thus, there is no need to stop the game. The game logic server does not need to generate an updated version.

The game logic server can be configured to provide service of specific game-play logic for multiple clients, synchronize game environment data to a corresponding AI system on the AI server, request a matching AI behavior (i.e., an AI behavior matching game environment data), and receive the result of the operation from the AI server. For example, in the Legend of Heroes game, the game logic server can be MainSvr.

An AI server can be mounted with any AI systems of various games. Each AI system can be loaded with specified AI rule library or AI rule libraries, and can cache or buffer the matching game environment data. For example, in the Legend of Heroes game, the AI server can be AISvr.

Based on actual applications, AI rule configuration as shown in FIGS. 9-10 can either refer to AI rule library having an AI behavior configuration file stored, or refer to an AI behavior configuration file that is stored in the AI rule library.

Figure 11:
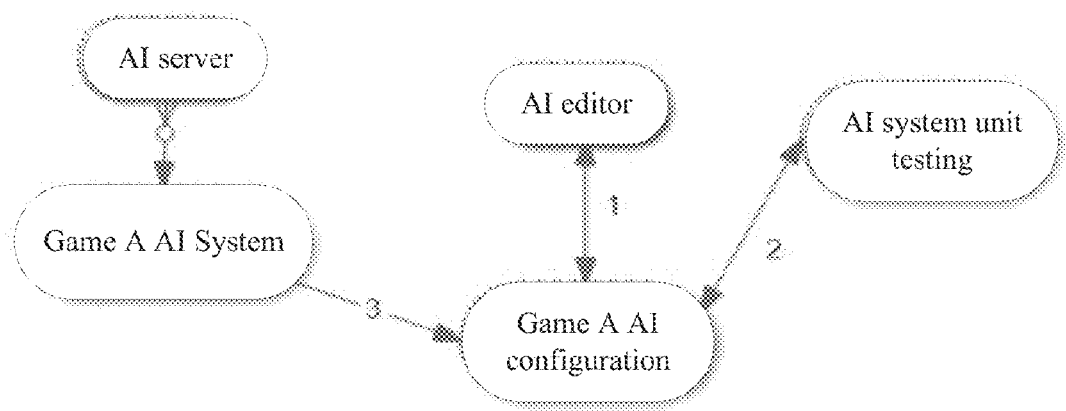
FIG. 11 depicts an exemplary interactive process between an AI editor and an AI system in accordance with various disclosed embodiments.

FIG. 11 depicts an exemplary interactive process between an AI editor and an AI system in accordance with various disclosed embodiments. As shown in FIG. 11, the interactive process can include the following exemplary steps.

In Step 1, an AI editor creates new AI configuration, or loads existing AI configuration, to edit the AI configuration and store the AI configuration. In Step 2, the AI system unit testing module debugs the edited AI configuration, runs the edited AI configuration, and analyzes result of running the edited AI configuration. Steps 1-2 can be repeatedly performed, until the AI behavior implemented by the AI configuration is desirable. The AI configuration can refer to an AI behavior or an AI behavior configuration file corresponding to an AI behavior.

In Step 3, the AI configuration is sent to the AI server via file transfer, or via a method for sending configuration downwards. The AI server can then call the reload configuration (e.g., ReloadCfg) interface of the AI system of the corresponding game, and can thus implement dynamic updating of the AI rules, i.e., AI rule library. The AI configuration as shown in FIG. 11 can refer to the AI rule configuration as depicted in FIGS. 9-10.

Part or all of the steps in the methods in accordance with various embodiments can be accomplished using hardware, or using a program/software to instruct related hardware. The program/software can be stored in a non-transitory computer-readable storage medium including, e.g., ROM/RAM, magnetic disk, optical disk, etc.

The embodiments disclosed herein are exemplary only. Other applications, advantages, alternations, modifications, or equivalents to the disclosed embodiments are obvious to those skilled in the art and are intended to be encompassed within the scope of the present disclosure.

INDUSTRIAL APPLICABILITY AND ADVANTAGEOUS EFFECTS

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments can be obvious to those skilled in the art and can be included in this disclosure.

The disclosed methods, apparatus and artificial intelligence (AI) editors for implementing an AI behavior can be used in a variety of computer applications. The computer applications can include any application programs that involve AI technology. The application programs can include, but are not limited to, games, online transaction, and computer-aided interactive learning.

Using the methods in accordance with various embodiments, an AI behavior configuration file can be obtained. The AI behavior configuration file can be configured and generated using at least one preset component. It can be tested whether a result of running the AI behavior configuration file reaches a preset effect. Thus, an AI behavior does not have to be implemented by compiling code. Operation of implementing the AI behavior can be simplified. The development cycle for implementing the AI behavior can be shortened. The efficiency of implementing the AI behavior can be improved. In addition, when a certain AI behavior needs to be added to or deleted from a certain application, such adding or deleting can be accomplished simply by modifying a component that is called. The code no longer needs to be modified. Thus, investment of time and labor cost can be reduced.

By using the methods disclosed herein, before implementing an AI behavior, via certain encapsulating tools or means, code for implementing specific functions can be encapsulated into components for implementing the specific functions. An encapsulated component can have a function independent of other components. Interface between components can be specified by a contract. A component can have a clear dependence on context, can be deployed independently, and can be assembled.

Further, in various embodiments, in order to quickly determine which components to call during the subsequent implementing of an AI behavior, the encapsulated components for implementing the specific functions, and types, functions, detailed information, initialization parameters, and mounting topology of the components can be stored in node configuration at the same time. Thus, when the components are subsequently being used, the components that are needed can be directly called from the node configuration. The components stored in the node configuration can be called by various different AI agents in the same application, and/or be called by AI agents in different application programs. Thus, the components not only are versatile, but also can improve efficiency of designing an application program during the design of the application program.

By using the disclosed methods, apparatus, and AI editors for implementing an AI behavior, during the updating of the AI behavior of the application, there is no need to re-release a new version of the application program or to patch the application. Thus, the operation of updating the application program can be more convenient.

In addition, when different application programs are to implement a certain identical function, identical components can be used to configure AI behavior configuration files. Further, an AI system of an application can be designed by calling components to configure an AI behavior configuration file and further by combining AI behavior configuration files. Thus, it is no longer necessary to compile code for each application program in order to implement the each application program. Thus, efficiency of designing the AI system of the application program can be improved.

What is claimed is:

1. A method for implementing an artificial intelligence (AI) behavior, comprising:
obtaining an AI behavior configuration file, wherein the AI behavior configuration file is configured using at least one preset component and the AI behavior configuration file matches logic of a preset AI behavior;
testing whether a result of running the AI behavior configuration file reaches a preset effect; and
when the result of running the AI behavior configuration file reaches the preset effect, implementing the preset AI behavior according to the AI behavior configuration file,
wherein before obtaining the AI behavior configuration file, the method further comprises:
encapsulating code for implementing specific functions into components for implementing the specific functions;
storing, in node configuration, each component of the components for implementing the specific functions and one or more of a type, a function, detailed information, an initialization parameter, and mounting topology, of the each component; and
wherein the obtaining of the AI behavior configuration file comprises: calling the at least one preset component from the node configuration to configure the AI behavior configuration file.

2. The method according to claim 1, wherein the obtaining of the AI behavior configuration file comprises:
calling the at least one preset component from the node configuration to configure a first AI behavior configuration file;
obtaining a second AI behavior configuration file from an AI rule library, wherein the AI rule library has at least one AI behavior configuration file pre-stored therein; and
combining the first AI behavior configuration file and the second AI behavior configuration file to obtain the AI behavior configuration file.

3. The method according to claim 1, wherein the obtaining of the AI behavior configuration file comprises:
obtaining the AI behavior configuration file from an AI rule library, wherein the AI rule library has at least one AI behavior configuration file pre-stored therein.

4. The method according to claim 1, wherein after calling the at least one preset component from the node configuration to configure the AI behavior configuration file, the method further comprises:
storing the obtained AI behavior configuration file in the AI rule library.

5. The method according to claim 1, wherein the testing of whether the result of running the AI behavior configuration file reaches the preset effect comprises:
loading application program environment data related to the preset effect;
running the AI behavior configuration file by integrating the application program environment data;
previewing whether the result of running the AI behavior configuration file is consistent with the preset effect; and
when the result of running the AI behavior configuration file is consistent with the preset effect, the result of running the AI behavior configuration file reaches the preset effect.

6. The method according to claim 1, further comprising:
after implementing the preset AI behavior according to the AI behavior configuration file, sending the AI behavior configuration file to an AI server for the AI server to update an AI rule library, wherein:
the AI rule library stores the AI behavior configuration file;
the AI server is mounted with an AI system of at least one application program;
the AI system of the at least one application program includes the AI rule library; and
the AI rule library stores at least one AI behavior configuration file.

7. An apparatus for implementing an AI behavior, comprising:
a memory; a processor coupled to the memory; and program modules stored in the memory to be executed by the processor, the programs modules comprising:
an obtaining module configured to obtain an AI behavior configuration file, wherein the AI behavior configuration file is configured using at least one preset component and the AI behavior configuration file matches logic of a preset AI behavior;
a testing module configured to test whether a result of running the AI behavior configuration file reaches a preset effect;
an implementing module configured to, when the result of running the AI behavior configuration file reaches the preset effect, implement the preset AI behavior according to the AI behavior configuration file,
an encapsulating module configured to encapsulate code for implementing specific functions into components for implementing the specific functions;
a storing module configured to store, in node configuration, each component of the components for implementing the specific functions and one or more of a type, a function, detailed information, an initialization parameter, and mounting topology, of the each component;
wherein the obtaining module is configured to call the at least one preset component from the node configuration to configure the AI behavior configuration file.

8. The apparatus according to claim 7, wherein the obtaining module is configured to:
call the at least one preset component from the node configuration to configure a first AI behavior configuration file;
obtain a second AI behavior configuration file from an AI rule library, wherein the AI rule library has at least one AI behavior configuration file pre-stored therein; and
combine the first AI behavior configuration file and the second AI behavior configuration file to obtain the AI behavior configuration file.

9. The apparatus according to claim 1, wherein the obtaining module is configured to:
obtain the AI behavior configuration file from an AI rule library, wherein the AI rule library has at least one AI behavior configuration file pre-stored therein.

10. The apparatus according to claim 1, wherein the storing module is configured to store the obtained AI behavior configuration file in the AI rule library.

11. The apparatus according to claim 7, wherein the testing module comprises:
a loading unit configured to load application program environment data related to the preset effect;
a running unit configured to run the AI behavior configuration file by integrating the application program environment data;

a previewing unit configured to preview whether the result of running the AI behavior configuration file is consistent with the preset effect; and a determining unit configured to, when the result of running the AI behavior configuration file is consistent with the preset effect, determine that the result of running the AI behavior configuration file reaches the preset effect.

12. The apparatus according to claim 7, further comprising:
a sending module configured to send the AI behavior configuration file to an AI server, to cause the AI server to update an AI rule library, wherein:
the AI rule library stores the AI behavior configuration file;
the AI server is mounted with an AI system of at least one application program;
the AI system of the at least one application program includes the AI rule library; and
the AI rule library stores at least one AI behavior configuration file.

13. A non-transitory computer-readable medium having computer program for, when being executed by a processor, performing a method for implementing an artificial intelligence (AI) behavior, the method comprising:
obtaining an AI behavior configuration file, wherein the AI behavior configuration file is configured using at least one preset component and the AI behavior configuration file matches logic of a preset AI behavior;
testing whether a result of running the AI behavior configuration file reaches a preset effect; and
when the result of running the AI behavior configuration file reaches the preset effect, implementing the preset AI behavior according to the AI behavior configuration file,
wherein before obtaining the AI behavior configuration file, the method further comprises:
encapsulating code for implementing specific functions into components for implementing the specific functions;
storing, in node configuration, each component of the components for implementing the specific functions and one or more of a type, a function, detailed information, an initialization parameter, and mounting topology, of the each component; and
wherein the obtaining of the AI behavior configuration file comprises: calling the at least one preset component from the node configuration to configure the AI behavior configuration file.

14. The non-transitory computer-readable medium according to claim 13, wherein the obtaining of the AI behavior configuration file comprises:
calling the at least one preset component from the node configuration to configure a first AI behavior configuration file;
obtaining a second AI behavior configuration file from an AI rule library, wherein the AI rule library has at least one AI behavior configuration file pre-stored therein; and
combining the first AI behavior configuration file and the second AI behavior configuration file to obtain the AI behavior configuration file.

15. The non-transitory computer-readable medium according to claim 13, wherein the obtaining of the AI behavior configuration file comprises:
obtaining the AI behavior configuration file from an AI rule library, wherein the AI rule library has at least one AI behavior configuration file pre-stored therein; and
storing the obtained AI behavior configuration file in the AI rule library.

16. The non-transitory computer-readable medium according to claim 13, wherein the testing of whether the result of running the AI behavior configuration file reaches the preset effect comprises:
loading application program environment data related to the preset effect;
running the AI behavior configuration file by integrating the application program environment data;
previewing whether the result of running the AI behavior configuration file is consistent with the preset effect; and
when the result of running the AI behavior configuration file is consistent with the preset effect, the result of running the AI behavior configuration file reaches the preset effect.

17. The non-transitory computer-readable medium according to claim 13, further comprising:
after implementing the preset AI behavior according to the AI behavior configuration file, sending the AI behavior configuration file to an AI server for the AI server to update an AI rule library, wherein:
the AI rule library stores the AI behavior configuration file;
the AI server is mounted with an AI system of at least one application program;
the AI system of the at least one application program includes the AI rule library; and
the AI rule library stores at least one AI behavior configuration file.

* * * * *